US010945277B2

(12) United States Patent
Abdoli et al.

(10) Patent No.: US 10,945,277 B2
(45) Date of Patent: Mar. 9, 2021

(54) METHODS AND APPARATUS FOR SWITCHING BETWEEN BANDWIDTH PARTS

(71) Applicant: HUAWEI TECHNOLOGIES CO., LTD., Guangdong (CN)

(72) Inventors: Javad Abdoli, Kanata (CA); Zhenfei Tang, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/222,288

(22) Filed: Dec. 17, 2018

(65) Prior Publication Data
US 2019/0215847 A1 Jul. 11, 2019

Related U.S. Application Data

(60) Provisional application No. 62/616,118, filed on Jan. 11, 2018.

(51) Int. Cl.
*H04W 72/12* (2009.01)
*H04W 72/04* (2009.01)
*H04W 72/02* (2009.01)

(52) U.S. Cl.
CPC ....... *H04W 72/1263* (2013.01); *H04W 72/02* (2013.01); *H04W 72/0453* (2013.01); *H04W 72/042* (2013.01)

(58) Field of Classification Search
CPC ... H04L 5/0007; H04L 5/0053; H04L 5/0098; H04W 8/24; H04W 8/245; H04W 36/06;
(Continued)

(56) References Cited

U.S. PATENT DOCUMENTS

2015/0050941 A1 2/2015 Sawada et al.
2016/0227535 A1 8/2016 Sharma et al.
(Continued)

FOREIGN PATENT DOCUMENTS

| CN | 104160769 A | 11/2014 |
| CN | 106714322 A | 5/2017 |
| CN | 107211423 A | 9/2017 |

OTHER PUBLICATIONS

"3rd Generation Partnership Project; Technical Specification Group Radio Access Network; NR; Physical layer procedures for control (Release 15)"; 3GPP TS 38.213 V1.2.0; Nov. 2017; 38 pages.
(Continued)

*Primary Examiner* — Kan Yuen
(74) *Attorney, Agent, or Firm* — Slater Matsil, LLP

(57) ABSTRACT

A user equipment (UE) receives control signaling in a scheduling bandwidth part (BWP). The control signaling indicates switching from a first active BWP to a second active BWP or switching from a first active BWP pair to a second active BWP pair for the UE. The control signaling aligns with a time unit boundary, such as a slot boundary, that is associated with the scheduling BWP. In the event that a scheduled BWP for a UE has a different numerology than a scheduling BWP that is currently active for the UE, the UE could switch from the scheduling BWP to the scheduled BWP based on a control signaling monitoring periodicity of the scheduled BWP.

28 Claims, 8 Drawing Sheets

(58) Field of Classification Search
CPC ... H04W 72/02; H04W 72/04; H04W 72/042; H04W 72/0446; H04W 72/006; H04W 72/0453; H04W 72/1263; H04W 72/1289
See application file for complete search history.

(56) References Cited

U.S. PATENT DOCUMENTS

| | | | |
|---|---|---|---|
| 2018/0131482 A1 | 5/2018 | Zhou et al. | |
| 2019/0103953 A1 | 4/2019 | Liao et al. | |
| 2019/0132109 A1 | 5/2019 | Zhou et al. | |
| 2019/0158229 A1* | 5/2019 | Wei | H04W 76/28 |
| 2019/0166066 A1* | 5/2019 | Ang | H04L 47/724 |
| 2019/0306737 A1 | 10/2019 | Kwak et al. | |

OTHER PUBLICATIONS

"RAN1 Chairman's Notes"; 3GPP TSG RAN WG1 Meeting #88bis; Spokane, USA; Apr. 3-7, 2017; 113 pages.

"RAN1 Chairman's Notes"; 3GPP TSG RAN WG1 Meeting NR#3; Nagoya, Japan; Sep. 18-21, 2017; 63 pages.

"RAN1 Chairman's Notes"; 3GPP TSG RAN WG1 Meeting #90bis; Prague, CZ; Oct. 9-13, 2017; 162 pages.

"RAN1 Chairman's Notes"; 3GPP TSG RAN WG1 Meeting 91; Reno, USA; Nov. 27-Dec. 1, 2017; 180 pages.

R4-1714474; "WF on some clarification issues for wideband operation"; 3GPP TSG RAN WG4 #85 Meeting 91; Reno, USA; Nov. 27-Dec. 1, 2017; Agenda: 9.3.1.2; 8 pages.

Intel Corporation, "Remaining details for bandwidth parts", 3GPP TSG RAN WG1 Meeting 91, R1-1720100, Nov. 27-Dec. 1, 2017, 4 Pages, Reno, USA.

Samsung, "On timing between DCI indicating active BWP switching and active BWP switching", 3GPP TSG RAN WG1 meeting 91, R1-1720338, Nov. 27-Dec. 1, 2017, 4 Pages, Reno, USA.

Vivo, "Other aspects on bandwidth Parts", 3GPP TSG RAN WG1 Meeting 91, R1-1719800, Nov. 27-Dec. 1, 2017, 8 Pages, Reno, USA.

* cited by examiner

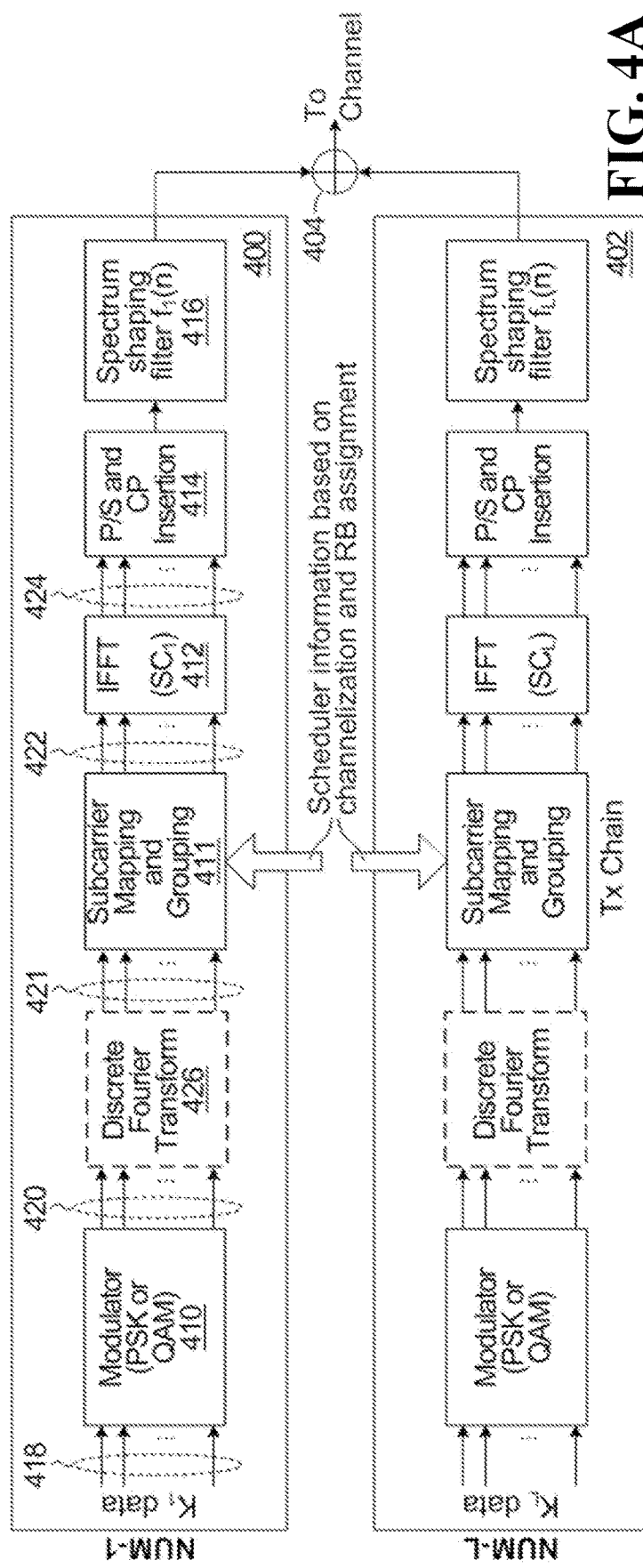
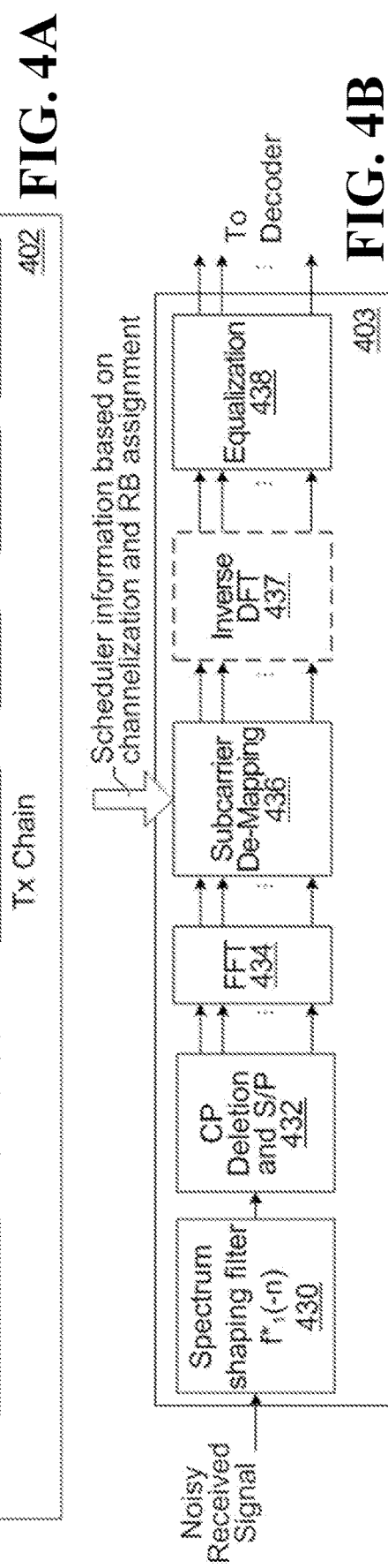
FIG. 4A
FIG. 4B

METHODS AND APPARATUS FOR SWITCHING BETWEEN BANDWIDTH PARTS

CROSS-REFERENCE TO RELATED APPLICATION

The present application is related to, and claims the benefit of, U.S. Provisional Application Ser. No. 62/616,118, entitled "METHODS AND APPARATUS FOR SWITCHING BETWEEN BANDWIDTH PARTS HAVING DIFFERENT NUMEROLOGIES", and filed on Jan. 11, 2018, the entire contents of which are incorporated herein by reference.

FIELD

The present disclosure relates to generally to communications and, in particular, to switching between Bandwidth Parts (BWPs), which could have different numerologies.

BACKGROUND

One or multiple BWP configurations for each of multiple component carriers can be semi-statically signalled to a User Equipment (UE). A bandwidth part consists of a group of contiguous Physical Resource Blocks (PRBs). Reserved resources can be configured within a BWP. The bandwidth of a BWP is equal to or smaller than a maximum bandwidth capability supported by a UE, and is at least as large as a synchronization signal (SS) block bandwidth. A BWP might or might not, however, actually contain an SS block.

Configuration of a BWP could include the following properties: numerology, frequency location (such as starting frequency), and bandwidth (such as number of PRBs). Different BWPs could have different numerologies.

Some communication standards are intended to support the case that a single scheduling Downlink Control Information (DCI) block can switch the active BWP of a UE from one BWP to another BWP of the same link direction within a given serving cell. For paired spectrum, downlink (DL) and uplink (UL) BWPs could be configured separately and independently for each UE-specific serving cell for a UE. In such implementations, for active BWP switching using at least scheduling DCI, DCI for DL is used for DL active BWP switching and DCI for UL is used for UL active BWP switching. For unpaired spectrum, a DL BWP and an UL BWP could be jointly configured as a pair, with the restriction that the DL and UL BWPs of such a DL/UL BWP pair share the same center frequency but may be of different bandwidths for each UE-specific serving cell for a UE. For active BWP switching using at least scheduling DCI in such implementations, DCI for either DL or UL could be used for active BWP switching from one DL/UL BWP pair to another pair. This applies to at least the case where both DL and UL are activated to a UE in corresponding unpaired spectrum.

SUMMARY

Motivations for BWP switching, with mixed numerologies in some embodiments, could include, for example, providing different services to a UE (Time Division Multiplexing (TDM) between different services, and/or switching between the services for example). BWP switching, with mixed numerologies in some embodiments, could also or instead provide for resource sharing between different services from a network perspective.

According to a further aspect of the present disclosure, a method performed at a UE involves receiving control signaling in a scheduling BWP. The control signaling indicates switching from a first active BWP to a second active BWP or switching from a first active BWP pair to a second active BWP pair for the UE, and aligns with a time unit boundary that is associated with the scheduling BWP.

According to another aspect, a non-transitory processor-readable medium stores instructions which, when executed by one or more processors, cause the one or more processors to perform such a method.

A UE according to a further aspect includes a processor and a non-transitory processor-readable storage medium storing instructions for execution by the processor. The instructions cause the processor to perform a method. The method involves receiving control signaling in a scheduling BWP. The control signaling indicates switching from a first active BWP to a second active BWP or switching from a first active BWP pair to a second active BWP pair for the UE, and the control signaling aligns with a time unit boundary that is associated with the scheduling BWP.

Another method consistent with the present disclosure is performed at network equipment. The method involves transmitting control signaling to a UE in a scheduling BWP. The control signaling indicates switching from a first active BWP to a second active BWP or switching from a first active BWP pair to a second active BWP pair for the UE, and aligns with a time unit boundary that is associated with the scheduling BWP.

A non-transitory processor-readable medium according to another aspect of the present disclosure stores instructions which, when executed by one or more processors, cause the one or more processors to perform such a method.

Network equipment according to yet another aspect includes a processor and a non-transitory processor-readable storage medium storing instructions for execution by the processor. The instructions cause the processor to perform such a method, which involves transmitting control signaling to a UE in a scheduling BWP. The control signaling indicates switching from a first active BWP to a second active BWP or switching from a first active BWP pair to a second active BWP pair for the UE, and aligns with a time unit boundary associated with the scheduling BWP.

According to a further aspect of the present disclosure, a method performed at a UE involves: receiving an indication of a scheduled BWP for the UE; determining whether the scheduled BWP has a different numerology than a scheduling BWP that is currently active for the UE; switching from the scheduling BWP to the scheduled BWP based on a control signaling monitoring periodicity of the scheduled BWP if the scheduled BWP has a different numerology than the scheduling BWP.

Another aspect of the present disclosure relates to a UE that includes a processor and a non-transitory computer readable storage medium storing instructions for execution by the processor. The instructions cause the processor to perform a method that involves: receiving an indication of a scheduled BWP for the UE; determining whether the scheduled BWP has a different numerology than a scheduling BWP that is currently active for the UE; switching from the scheduling BWP to the scheduled BWP based on a control signaling monitoring periodicity of the scheduled BWP if the scheduled BWP has a different numerology than the scheduling BWP.

Also disclosed is a method performed at network equipment. Such method could include: transmitting an indication of a scheduled BWP to a UE, the scheduled BWP having a different numerology than a scheduling BWP that is currently active for the UE, to cause the UE to switch from the scheduling BWP to the scheduled BWP based on a control signaling monitoring periodicity of the scheduled BWP; and communicating with the UE using the scheduled BWP.

Another method performed at network equipment involves: transmitting to a UE, using a scheduling BWP that is currently active for the UE, an indication of a scheduled BWP having a different numerology than the scheduling BWP; transmitting data to the UE using the scheduled BWP and based on a control signaling monitoring periodicity of the scheduled BWP.

Network equipment could include: a processor; and a non-transitory computer readable storage medium storing instructions for execution by the processor, the instructions causing the processor to perform a network equipment method as disclosed herein.

Aspects also relate to non-transitory processor-readable media storing instructions which, when executed by one or more processors, cause the one or more processors to perform a method as disclosed herein.

These and other illustrative embodiments are disclosed by way of example in the description and claims.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

FIG. 4A is an example simplified block diagram of part of a transmitter.

FIG. 4B shows a simplified block diagram of a receive chain.

DETAILED DESCRIPTION

Figure 1:
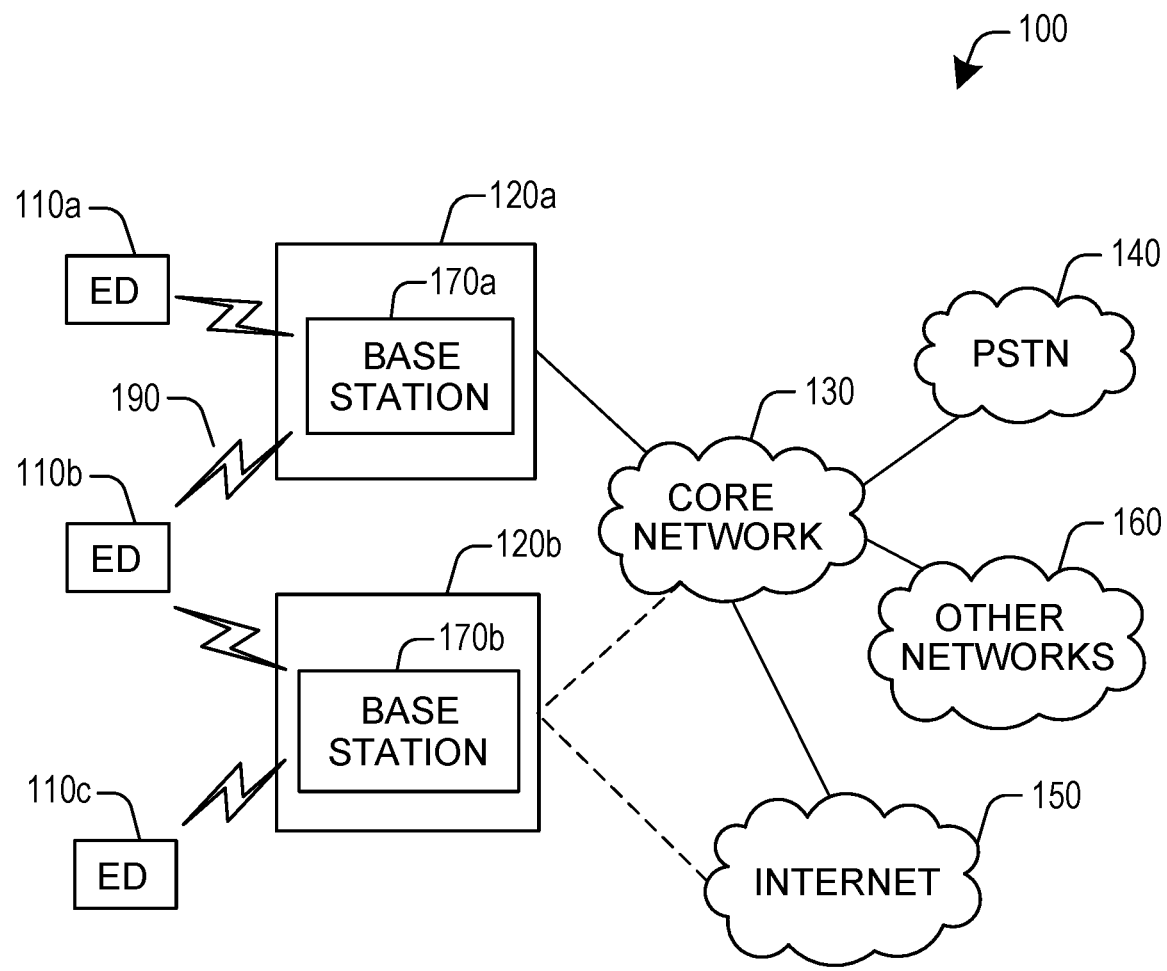
FIG. 1 is a network diagram of an example communication system.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such cells. In some embodiments, multiple transceivers could be used for each cell, for example using multiple-input multiple-output (MIMO) technology. The number of RAN 120a-120b shown is by way of example only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs 110a-110c may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such radio access technologies.

Figure 2:
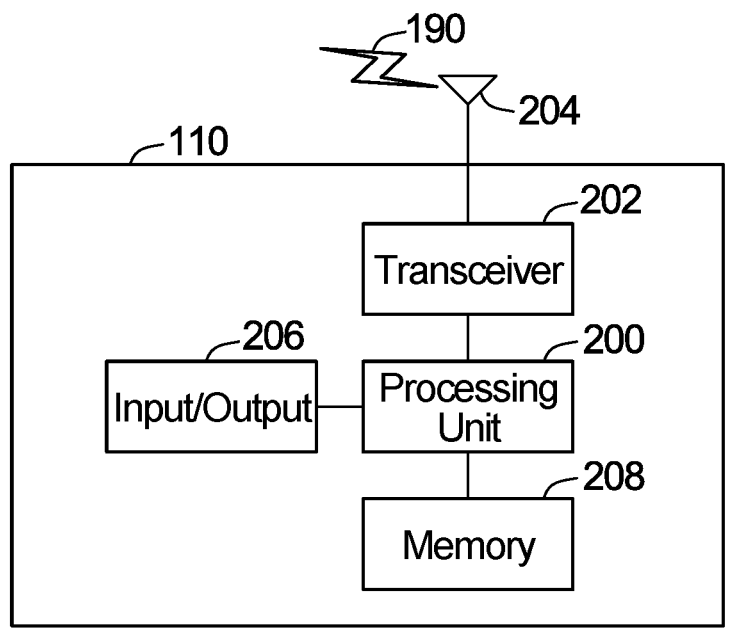
FIG. 2 is a block diagram of an example electronic device.
Figure 3:
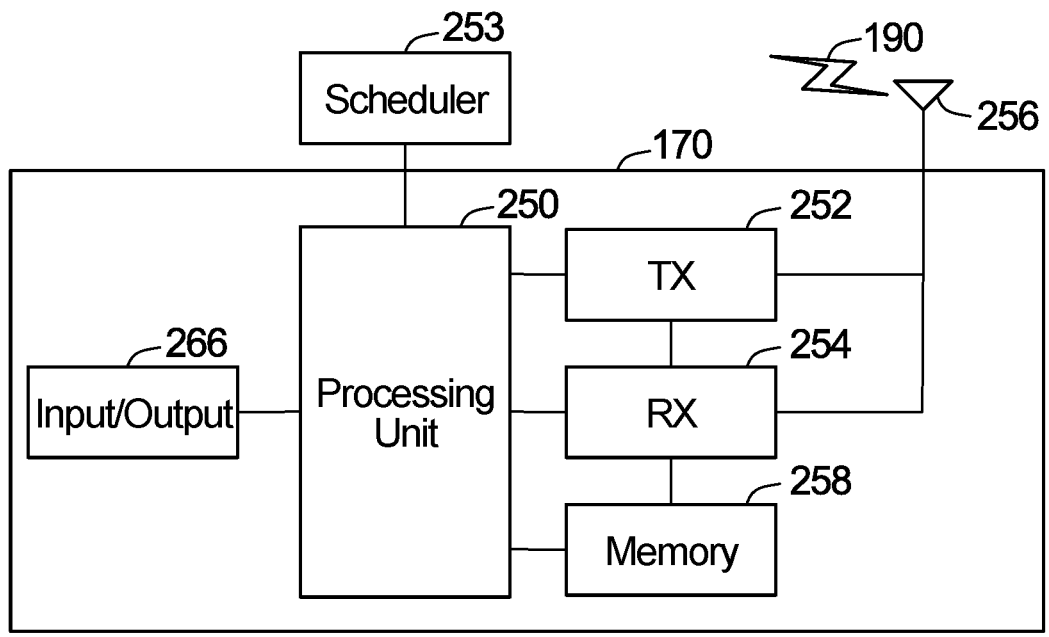
FIG. 3 is a block diagram of another example electronic device.

FIGS. 2 and 3 illustrate example devices that may implement the methods and teachings according to this disclosure. In particular, FIG. 2 illustrates an example ED 110, and FIG. 3 illustrates an example base station 170. These components could be used in the communication system 100 or in any other suitable system.

As shown in FIG. 2, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described herein and that are executed by the processing unit(s) 250.

Each input/output device 266 permits interaction with a user or other devices in the network. Each input/output device 266 includes any suitable structure for providing information to or receiving/providing information from a user, including network interface communications.

A UE such as an ED 110 could be configured with one or multiple BWP configurations, one of which would be active at any time. BWP configurations and the active BWP could be controlled by and signalled to a UE by a base station 170 or other network element and scheduled by the scheduler 253. According to embodiments disclosed herein, a UE may switch between BWPs that have different numerologies.

Frame structures that are flexible in terms of the use of differing numerologies have been proposed. A numerology is defined as the set of physical layer parameters of the air interface that are used to communicate a particular signal. A numerology is described in terms of at least subcarrier spacing (SCS) and Orthogonal Frequency Division Multiplexing (OFDM) symbol duration, and may also be defined by other parameters such as fast Fourier transform (FFT)/inverse FFT (IFFT) length, transmission time slot length, and cyclic prefix (CP) length or duration. In some implementations, the definition of the numerology may also include which one of several candidate waveforms is used to communicate the signal. Possible waveform candidates may include, but are not limited to, one or more orthogonal or non-orthogonal waveforms selected from the following: OFDM, Filtered OFDM (f-OFDM), Filter Bank Multicarrier (FBMC), Universal Filtered Multicarrier (UFMC), Generalized Frequency Division Multiplexing (GFDM), Single Carrier Frequency Division Multiple Access (SC-FDMA), Low Density Signature Multicarrier Code Division Multiple Access (LDS-MC-CDMA), Wavelet Packet Modulation (WPM), Faster Than Nyquist (FTN) Waveform, low Peak to Average Power Ratio Waveform (low PAPR WF), Pattern Division Multiple Access (PDMA), Lattice Partition Multiple Access (LPMA), Resource Spread Multiple Access (RSMA), and Sparse Code Multiple Access (SCMA).

These numerologies may be scalable in the sense that subcarrier spacings of different numerologies are multiples of each other, and time slot lengths of different numerologies are also multiples of each other. Such a scalable design across multiple numerologies could provide implementation benefits, for example scalable total OFDM symbol duration in a time division duplex (TDD) context.

Table 1 below shows the parameters associated with some example numerologies, in the four columns under "Frame structure". Frames can be configured using one or a combination of the four scalable numerologies. For comparison purposes, in the right hand column of the table, the conventional fixed LTE numerology is shown. The first column is for a numerology with 60 kHz subcarrier spacing, which also has the shortest OFDM symbol duration because OFDM symbol duration varies inversely with subcarrier spacing. This may be suitable for ultra-low latency communications, such as Vehicle-to-Any (V2X) communications. The second column is for a numerology with 30 kHz subcarrier spacing. The third column is for a numerology with 15 kHz subcarrier spacing. This numerology has the same configuration as in LTE, except there are only 7 symbols in a time slot. This may be suitable for broadband services. The fourth column is for a numerology with 7.5 kHz spacing, which also has the longest OFDM symbol duration among the four numerologies. This may be useful for coverage enhancement and broadcasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths.

It is further contemplated that other subcarrier spacings may be used, such as higher or lower subcarrier spacings. As illustrated in the example in Table 1, the subcarrier spacing of each numerology (7.5 kHz, 15 kHz, 30 kHz, 60 kHz) can be a factor of $2^n$ times the smallest subcarrier spacing, where n is an integer. Larger subcarrier spacings that are also related by a factor of $2^n$, such as 120 kHz, may also or alternatively be used. Smaller subcarrier spacings that are also related by a factor of $2^n$, such as 3.75 kHz, may also or alternatively be used. The symbol durations of the numerologies may also be related by a factor of $2^n$. Two or more numerologies that are related in this way are sometimes referred to as scalable numerologies.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz, 120 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

In Table 1, each numerology uses a first cyclic prefix length for a first number of OFDM symbols, and a second cyclic prefix length for a second number of OFDM symbols. For example, in the first column under "Frame structure", the time slot includes 3 symbols with a cyclic prefix length of 1.04 μs followed by 4 symbols with a cyclic prefix length of 1.3 μs.

TABLE 1

Example set of Numerologies

| Parameters | Frame structure | | | | Baseline (LTE) |
|---|---|---|---|---|---|
| time slot Length | 0.125 ms | 0.25 ms | 0.5 ms | 1 ms | TTI = 1 ms |
| Subcarrier spacing | 60 kHz | 30 kHz | 15 kHz | 7.5 kHz | 15 kHz |

TABLE 1-continued

Example set of Numerologies

| Parameters | Frame structure | | | | Baseline (LTE) |
|---|---|---|---|---|---|
| FFT size | 512 | 1024 | 2048 | 4096 | 2048 |
| Symbol duration | 16.67 μs | 33.33 μs | 66.67 μs | 133.33 μs | 66.67 μs |
| #symbols in each time slot | 7 (3, 4) | 7 (3, 4) | 7 (3, 4) | 7 (3, 4) | 14 (2, 12) |
| CP length | 1.04 μs, 1.30 μs (32, 40 point) | 2.08 μs, 2.60 μs (64, 80 point) | 4.17 μs, 5.21 μs (128, 160 point) | 8.33 μs, 10.42 μs (256, 320 point) | 5.2 μs, 4.7 μs (160, 144 point) |
| CP overhead | 6.67% | 6.67% | 6.67% | 6.67% | 6.67% |
| BW (MHz) | 20 | 20 | 20 | 20 | 20 |

In Table 2, an example set of numerologies is shown, in which different cyclic prefix lengths can be used in different numerologies having the same subcarrier spacing.

TABLE 2

Example set of Numerologies

| | Subcarrier spacing (kHz) | | | | | |
|---|---|---|---|---|---|---|
| | 15 | 30 | 30 | 60 | 60 | 60 |
| Useful duration $T_u$ (μs) | 66.67 | 33.33 | 33.33 | 16.67 | 16.67 | 16.67 |
| CP length (μs) (1) | 5.2 | 5.73 | 2.6 | 2.86 | 1.3 | 3.65 |
| CP length (μs) (6 or 12) | 4.7 | 5.08 | 2.34 | 2.54 | 1.17 | 3.13 |
| # of symbols per TTI | 7(1, 6) | 13(1, 12) | 7(1, 6) | 13(1, 12) | 7(1, 6) | 25(10, 15) |
| TTI (ms) | 0.5 | 0.5 | 0.25 | 0.25 | 0.125 | 0.5 |
| CP overhead | 6.70% | 13.30% | 6.70% | 13.30% | 6.70% | 16.67% |

It should be understood that the specific numerologies of the examples of Tables 1 and 2 are for illustrative purposes, and that a flexible frame structure combining other numerologies could alternatively be employed.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be UEs. In a specific example, filtered OFDM (f-OFDM) can be employed by using filtering to shape the frequency spectrum of each sub-band OFDM signal, thereby producing a frequency localized waveform, and then combining the sub-band OFDM signals for transmission. f-OFDM lowers out-of-band emission and improves transmission, and addresses the non-orthogonality introduced as a result of the use of different subcarrier spacings. Alternatively, a different approach can be used to achieve a frequency localized waveform, such as windowed OFDM (W-OFDM).

The use of different numerologies can allow the coexistence of a diverse set of use cases having a wide range quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. The signaling can be done in a dynamic or a semi-static manner, for example in a control channel such as the physical downlink control channel (PDCCH) or in downlink control information (DCI). Based on this signaling, the ED may determine the parameters of the selected numerology from other information, such as a look-up table of candidate numerologies stored in memory.

Referring now to FIG. 4A, shown is an example simplified block diagram of part of a transmitter that can be used to perform channelization as described herein. In this example, there are L supported numerologies, where The transmit chain 400 for the first numerology includes a modulator 410, subcarrier mapping and grouping block 411, IFFT 412 with subcarrier spacing $SC_1$, parallel to serial and cyclic prefix insertion 414, and spectrum shaping filter 416. In operation, modulator 410 receives ED data (more generally, ED content containing data and/or signaling) for $K_1$ EDs, where $K_1 >= 1$. The data may be received from the output of an encoder, for example. The modulator 410 maps the ED data for each of the $K_1$ EDs to a respective stream of constellation symbols (e.g., PSK, QAM, OQAM) and outputs this at 420. The number of ED bits per symbol depends on the particular constellation employed by the modulator 410. In the example of $2^N$-quadrature amplitude modulation (QAM), N bits from for each ED are mapped to a respective QAM symbol.

Optionally, for example in SC-FDMA embodiments used for uplink communication, the output 420 is received by a discrete Fourier transform (DFT) 426. The output of the DFT is shown at 421. Other embodiments, such as OFDM embodiments, do not include the DFT 426, in which case the output 420 is passed directly to 421.

For each OFDM symbol period, the subcarrier mapping and grouping block 411 groups and maps the input 421 to the inputs of the IFFT 412 at 422. The grouping and mapping is performed based on scheduler information, which in turn is based on channelization and resource block assignment, in accordance with a defined resource block definition and allocation for the content of the $K_1$ EDs being processed in transmit chain 400. P is the size of the IFFT 412. Not all of the inputs are necessarily used for each OFDM symbol period. The IFFT 412 receives a number of symbols less than P, and outputs P time domain samples at 424. Following this, in some implementations, parallel to serial conversion is performed and a cyclic prefix is added in block 414. The spectrum shaping filter 416 applies a filter $f_1(n)$ which limits the spectrum at the output of the transmit chain 400 to reduce or prevent interference with the outputs of other transmit chains such as transmit chain 402. In some embodiments, the spectrum shaping filter 416 also performs shifting of each sub-band to its assigned frequency location. In other embodiments, a separate module (not shown) performs the shifting of each sub-band to its assigned frequency location.

The functionality of the other transmit chains, such as transmit chain 402, is similar. The outputs of all of the transmit chains are combined in a combiner 404 before transmission on the channel. In an alternative embodiment, the outputs of only a subset of the transmit chains are combined together for transmission on a single channel, and the outputs of the remaining transmit chains are transmitted on one or more other channels. This may be the case, for example, if RAN slicing is being used.

Although the apparatus of FIG. 4A is shown and described in reference to a base station, a similar structure could be implemented in an ED. An ED could have multiple transmit chains corresponding to multiple numerologies, or a single transmit chain. The transmissions of multiple EDs are combined over the air, and received together at the base station.

FIG. 4B shows a simplified block diagram of a receive chain for a user equipment or other electronic device operating with the first numerology depicted at 403. In some embodiments, a given electronic device operates with a configurable numerology, and is switchable between BWPs that have different numerologies as disclosed herein. Flexible resource block definitions are supported by the electronic device. The receive chain 403 includes spectrum shaping filter 430, cyclic prefix deletion and serial to parallel processing 432, fast Fourier transform (FFT) 434, subcarrier de-mapping 436, optional inverse DFT (IDFT) 437 for use with embodiment transmit chains including a DFT 426, and equalizer 438. It is contemplated that the spectrum shaping filter 430 may be replaced by a windowing module, a spectrally contained waveform selection module, or any other suitable module for producing a spectrally contained waveform. Each element in the receive chain performs corresponding reverse operations to those performed in the transmit chain. The receive chain for an electronic device operating with another numerology would be similar.

Embodiments of the present disclosure relate to switching between BWPs that have different numerologies. Although the terminology "BWP" and "numerology" is used herein and in some current $3^{rd}$ Generation Partnership Project (3GPP) standards-related documentation, such terminology is intended to encompass similar concepts that could be expressed in different terms. For example, BWPs might instead be referred to as sub-bands.

Other terminology, such as particular signaling and channels referenced herein, are similarly intended as illustrative examples, and not to limit embodiments only to communication systems that use such signaling and/or channels.

In $5^{th}$ Generation (5G) New Radio (NR), a UE periodically monitors for control signaling in order to locate incoming data. For example, Physical Downlink Control Channel (PDCCH) monitoring periodicity is configured per BWP, and a UE monitors PDCCH candidates at each PDCCH opportunity according to a current configured monitoring periodicity for an active BWP. Based on detection of a PDCCH that is associated with the UE, the UE can locate where DL data for the UE will be located in a Physical Downlink Shared Channel (PDSCH) or where the UE should transmit UL data in a Physical Uplink Shared Channel (PUSCH).

Turning now to BWP switching, the BWP in which a UE receives a scheduling signal for BWP switching is called the scheduling BWP, and the BWP in which the PDSCH or PUSCH is scheduled is called the scheduled BWP. In an embodiment, the scheduling signal is a scheduling DCI in the PDCCH. The scheduled PDSCH or PUSCH of a scheduled BWP may follow the slot structure and timing of the scheduled BWP. The scheduled PDSCH or PUSCH may be contained within one slot of the scheduled BWP or span multiple slots of the scheduled BWP. The scheduling signal, among other fields, may include a frequency domain resource allocation (RA) field, which indicates which frequency domain resources are assigned to the PDSCH or PUSCH for the UE. To lower complexity of PDCCH blind decoding, the size of the RA field is based on scheduling BWP, which is known to the UE.

Figure 5:
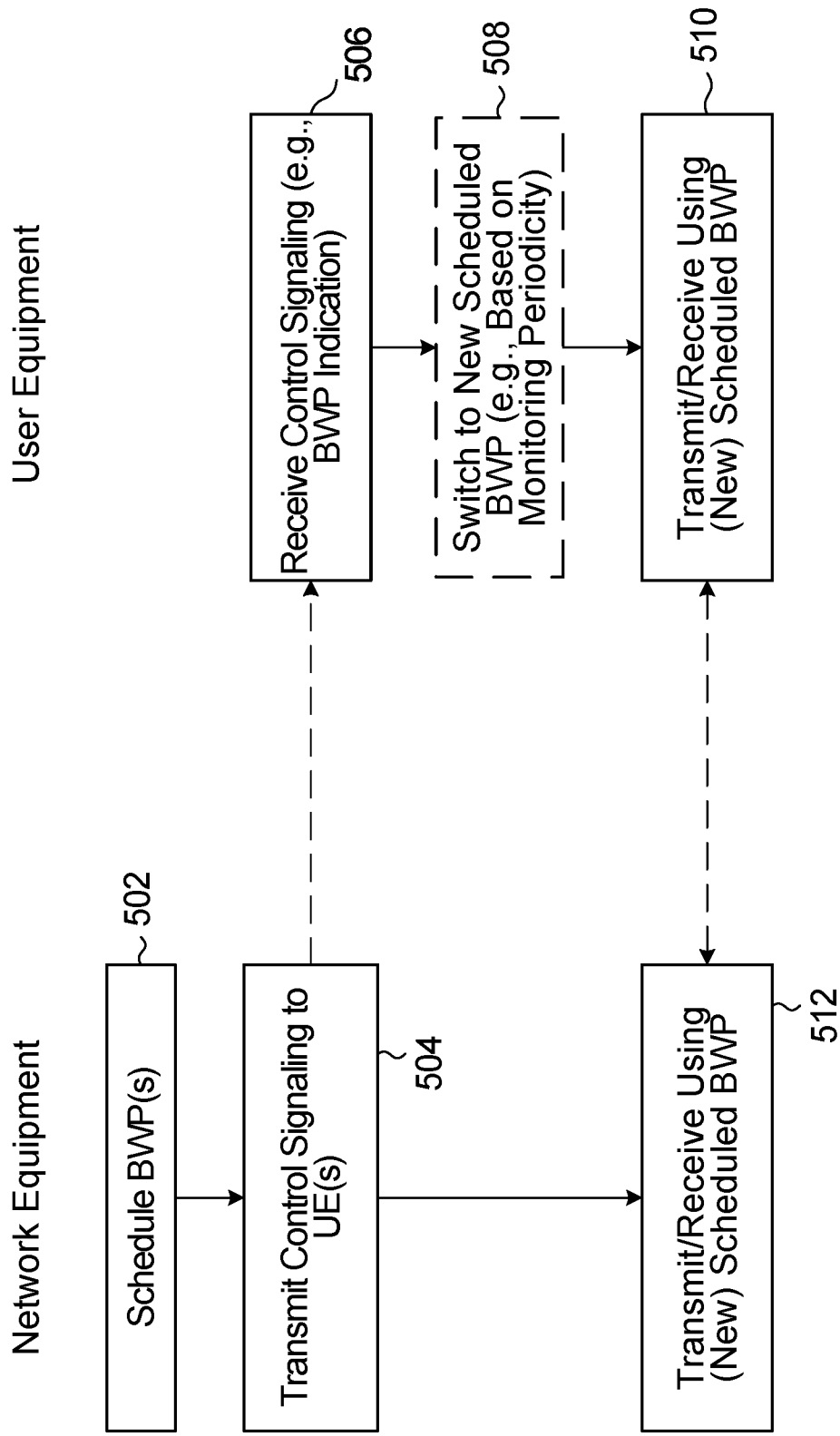
FIG. 5 is a flow diagram illustrating example methods according to embodiments.

FIG. 5 is a flow diagram illustrating example methods according to embodiments. Although FIG. 5 illustrates operations performed at network equipment such as a base station and operations performed at a UE, these operations could be implemented independently from each other.

In the example shown, one or more BWPs are scheduled at 502. The BWPs could also be configured at 502 if not previously configured, and in an embodiment up to 4 BWPs are configured per UE. The scheduling at 502 determines which of the configured BWPs is to be scheduled or active for each UE. At 504, control signaling is transmitted to the UE(s), and in some embodiments the control signaling includes an indication of the scheduled BWP. The control signaling could be in the form of a DCI on the PDCCH, for example. Other types of control signaling could also or instead be used to signal BWP configuration and/or scheduling, including Radio Resource Control (RRC) signaling, for example.

At the UE, an indication of the scheduled BWP for the UE is received at 506, in the control signaling in the example shown. The BWP indication could be explicit, in the form of an index, an offset from a current active BWP in the set of BWPs for the UE, or other information that explicitly specifies the active BWP. An implicit BWP indication, such as an empty field or a predetermined value, could be used to indicate that a scheduling (currently active) BWP is to remain active.

At 508, in some embodiments it is determined at the UE whether the scheduled BWP has a different numerology than the scheduling BWP that is currently active for the UE. Data could be transmitted and/or received at 510, 512 using the scheduling BWP if there is no change in BWP. Otherwise, 508 involves switching from the scheduling BWP to the scheduled BWP. According to some embodiments disclosed herein, this switching is based on a control signaling monitoring periodicity of the scheduled BWP if the scheduled BWP has a different numerology than the scheduling BWP.

Both slot and non-slot based scheduling at 502, and slot and non-slot based BWP switching at 508, could be supported. For example, in one embodiment a slot includes 14 symbols, whereas a non-slot could include other numbers of symbols. Non-slots are also referred to herein as mini-slots.

BWP switching based on control signaling monitoring periodicity at 508 could involve switching to the active BWP based not only on the monitoring periodicity, but also on timing of a control signaling candidate after a transition time following the receiving at 506. This is also referred to herein as Option A. For example, the UE could switch to a slot or non-slot of the scheduled BWP that includes a PDCCH monitoring occasion according to PDCCH monitoring periodicity of the scheduled (new active) BWP after the transition time.

The transition time could be considered from the receiving at 506 as described above, or could include or otherwise be considered after another time period such as a UE processing time for Hybrid Automatic Repeat Request (HARQ). The following table (reproduced from Table 2-1 in "RAN1 Chairman's Notes", 3GPP TSG RAN WG1 Meeting 91, Reno, USA, $27^{th}$ Nov.-$1^{st}$ Dec. 2017) provides an example of a capability defined as UE processing time for HARQ:

| Configuration | HARQ Timing Parameter | Units | 15 KHz SCS | 30 KHz SCS | 60 KHz SCS | 120 KHz SCS |
|---|---|---|---|---|---|---|
| Front-loaded DMRS only | N1 | Symbols | 8 | 10 | 17 | 20 |
| Front-loaded + additional DMRS | N1 | Symbols | 13 | 13 | 20 | 24 |
| Frequency-first RE-mapping | N2[1] | Symbols | 10 | 12 | 23 | 36 |

[1]If $1^{st}$ symbol of PUSCH is data-only or FDM data with DMRS, then add 1 symbol to N2 in table.

In an embodiment, the transition time may depend on UE processing time and HARQ timing capability. In another embodiment, different transition times may be specified for different UE processing time and HARQ timing capabilities.

In another embodiment, the BWP switching at 508 involves switching to the scheduled BWP based on the monitoring periodicity and timing of a control signaling candidate being aligned with a boundary associated with the scheduled BWP. A boundary as referenced herein is intended to denote a time unit boundary rather than a frequency boundary of a BWP. Such a boundary could be a frame boundary, a sub-frame boundary, a multiple sub-frame boundary, a slot boundary, or a multi-slot boundary, for example.

Switching to the scheduled BWP based on the monitoring periodicity and timing of a control signaling candidate being aligned with a boundary associated with the scheduled BWP is also referred to herein as Option B. For example, BWP switching based on a boundary could involve switching to a slot or non-slot which includes a PDCCH monitoring occasion according to PDCCH monitoring periodicity of the scheduled (new active) BWP at a slot boundary, sub-frame boundary or multiple sub-frame boundary of the scheduled (new active) BWP. Transition time could also be taken into account, in which case the switching at 508 involves switching to the active BWP based on the timing of the control signaling candidate being aligned with the boundary associated with the scheduled BWP after a transition time following the receiving at 506.

Boundary-based switching could also or instead have network-side implications. For example, according to another embodiment that is referred to herein as Option B-1, BWP switching is initiated only at a boundary associated with the current (scheduling) BWP. Such embodiments involve signaling BWP switching from a non-slot or slot of the scheduling (current active) BWP at a boundary such as a frame, sub-frame, multiple sub-frame, slot, or multi-slot boundary associated with the scheduling BWP. For example, network equipment could signal the indication of the scheduled BWP to the UE only in control signaling that aligns with a frame, sub-frame, multiple sub-frame, slot, or multi-slot boundary of the scheduling (current active) BWP. Option B-1 need not necessarily be implemented only in embodiments in which UEs implement boundary-based BWP switching.

With BWP switching initiated only at a boundary associated with the current (scheduling) BWP, control signaling transmitted by network equipment at 504 and received by a UE at 506 in the scheduling BWP aligns with a time unit boundary associated with the scheduling BWP. The control signaling indicates switching from a first active BWP to a second active BWP, or switching from a first active BWP pair to a second active BWP pair, for the UE.

FIGS. 6-12 are block diagrams that further illustrate BWP switching.

Figure 6:
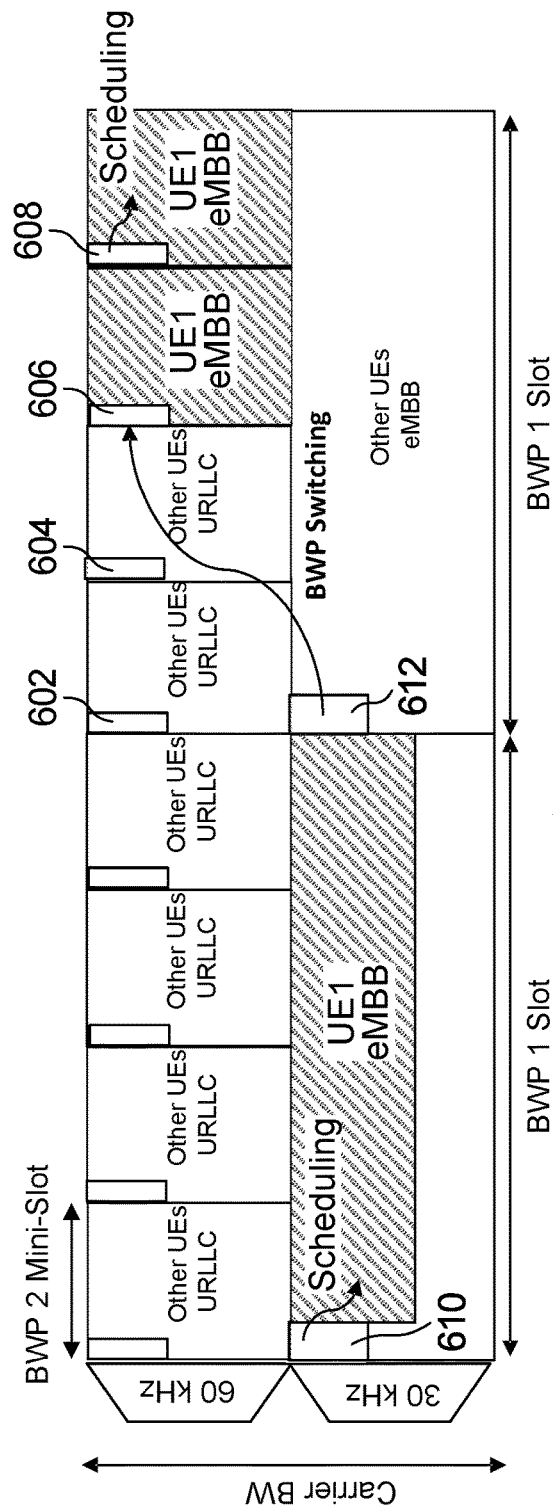
FIGS. 6-12 are block diagrams illustrating BWP switching.

In FIG. 6, a BWP1 with smaller 30 kHz SCS is scheduling a BWP2 with larger 60 kHz SCS. The example shown includes control signaling monitoring occasions such as 602, 604, 606, 608 in each BWP2 mini-slot, and 610, 612 in each BWP 1 slot. BWP1 is initially active for enhanced Mobile Broadband (eMBB) communications by UE1, and a first slot is scheduled at 610. At 612, in a DCI in the PDCCH for example, BWP switching to BWP2 is signaled. This could involve scheduling UE1 for BWP2 by including, in a DCI or other control signaling, an indication of BWP2 instead of BWP1. UE1 then performs control signaling monitoring according to a monitoring periodicity of the scheduled (new active) BWP2. Monitoring opportunity 602 in BWP2 might not be checked for a control signaling candidate by UE1 because BWP switching in this example is signaled to UE1 at 612. At some time after the control signaling at 612 is processed by UE1, UE1 switches to BWP2. In embodiments disclosed herein, the switch to BWP2 is according to monitoring periodicity associated with the new active BWP2. In FIG. 6, total transition time to switch from BWP1 to BWP2 is more than one BWP2 mini-slot but less than two BWP2 mini-slots, and therefore the switch is made after the BWP2 mini-slot that includes monitoring occasion 604, at the BWP2 mini-slot that includes monitoring occasion 606. Normal BWP2 scheduling for UE1 begins at 608.

FIG. 6 illustrates scheduling of a BWP2 with larger 60 kHz SCS by a BWP1 with smaller 30 kHz SCS, for the same UE1 service, eMBB in the example shown. Other UEs may use BWP2 for Ultra-Reliable Low latency Communications (URLLC) in FIG. 6. This example shows resource sharing between eMBB traffic and URLLC traffic in BWP2.

Figure 7:
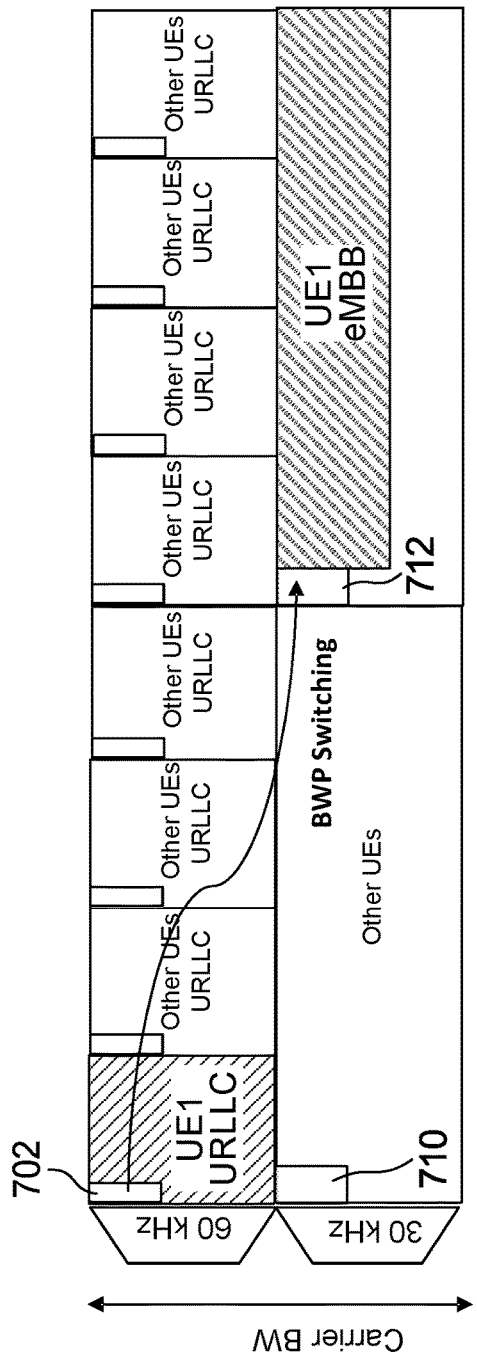

In FIG. 7, a BWP with larger 60 kHz SCS is scheduling a BWP with smaller 30 kHz SCS, and the two BWPs in this example are used by UE1 for different services, URLLC and eMBB. Control signaling monitoring occasions are shown for mini-slots and slots as in FIG. 6, but in FIG. 7 the BWP with 60 kHz SCS is initially active for UE1. At 702, in a DCI in the PDCCH for example, BWP switching to the BWP with 30 kHz SCS is signaled. As in the example described above with reference to FIG. 6, this could involve scheduling UE1 for the 30 kHz BWP by including, in a DCI or other control signaling, an indication of the 30 kHz BWP instead of the 60 kHz BWP. UE1 performs control signaling monitoring according to a monitoring periodicity of the scheduled (new active) the 30 kHz BWP. Monitoring opportunity 710 in the 30 kHz BWP might not be checked for a control signaling candidate by UE1 because BWP switching in this example is signaled to UE1 at 702. At some time after the control signaling at 702 is processed by UE1, UE1 switches to the 30 kHz BWP according to monitoring periodicity associated with the new active 30 kHz BWP. The total transition time to switch from the 60 kHz BWP to the 30 kHz BWP is less than one 30 kHz BWP slot, and therefore the switch is made at the 30 kHz BWP slot that includes monitoring occasion 712. Normal scheduling for UE1 in the 30 kHz begins at a next slot, after the slot that includes monitoring occasion 712.

Figure 8:
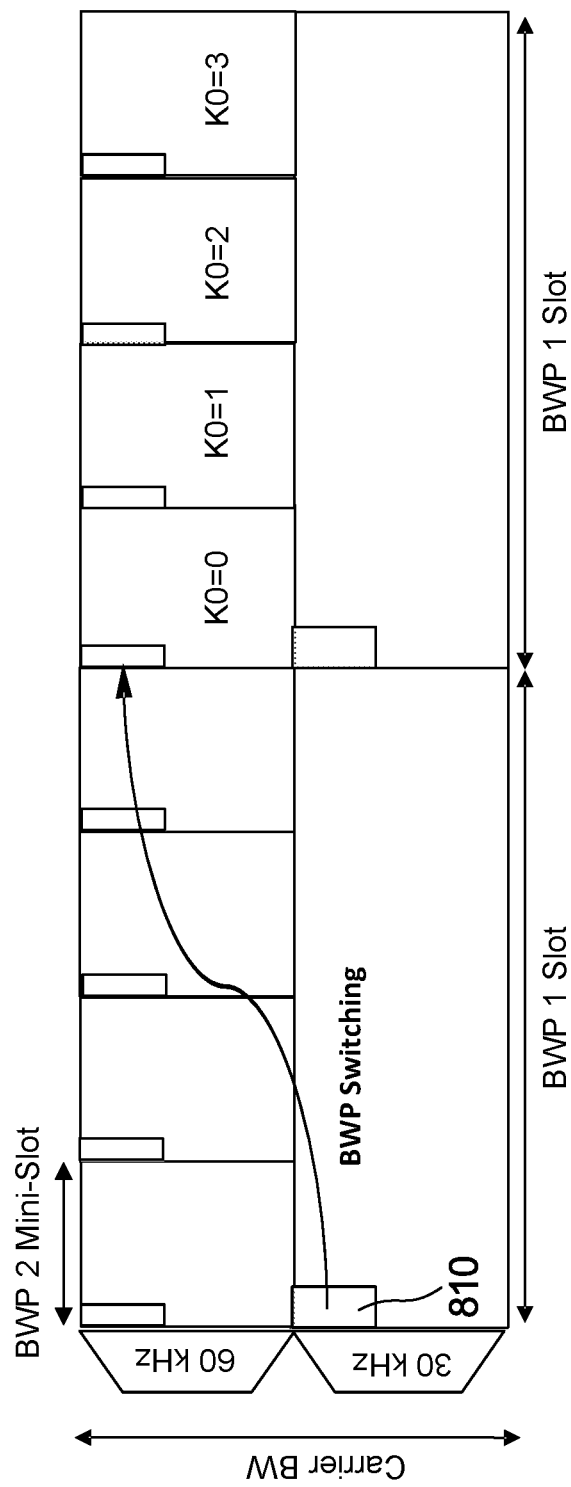

FIG. 8 illustrates different scheduling options based on a parameter K0. In some embodiments, HARQ timing is based on the scheduled BWP, with the parameter K0 denoting the first slot/mini-slot of the PDSCH and another parameter K2 denoting the first slot/mini-slot of the PUSCH, for example.

In the example shown in FIG. 8, BWP switching is signaled at 810, for a switch from BWP1 to BWP2. K0 values of 0 to 3 are labeled in BWP2. By way of example, consider K0=0, which corresponds to the first slot or mini-slot of the scheduled BWP2 which satisfies the following conditions in an embodiment:
the slot/mini-slot includes a PDCCH monitoring occasion according to the PDCCH monitoring periodicity of the scheduled BWP2;
the slot/mini-slot boundary lies on or after the boundary of the scheduling slot/mini-slot+transition time (+UE processing time).

Thus, K0=0 can be considered an example of same-slot scheduling. For K0=1 (second slot/mini-slot after the first slot described above, for example), K0=2 (third slot/mini-slot after the first slot described above, for example), K0=3 (fourth slot/mini-slot after the first slot described above, for example) in FIG. 8, the scheduling represents examples of cross-slot or cross mini-slot scheduling.

Figure 9:
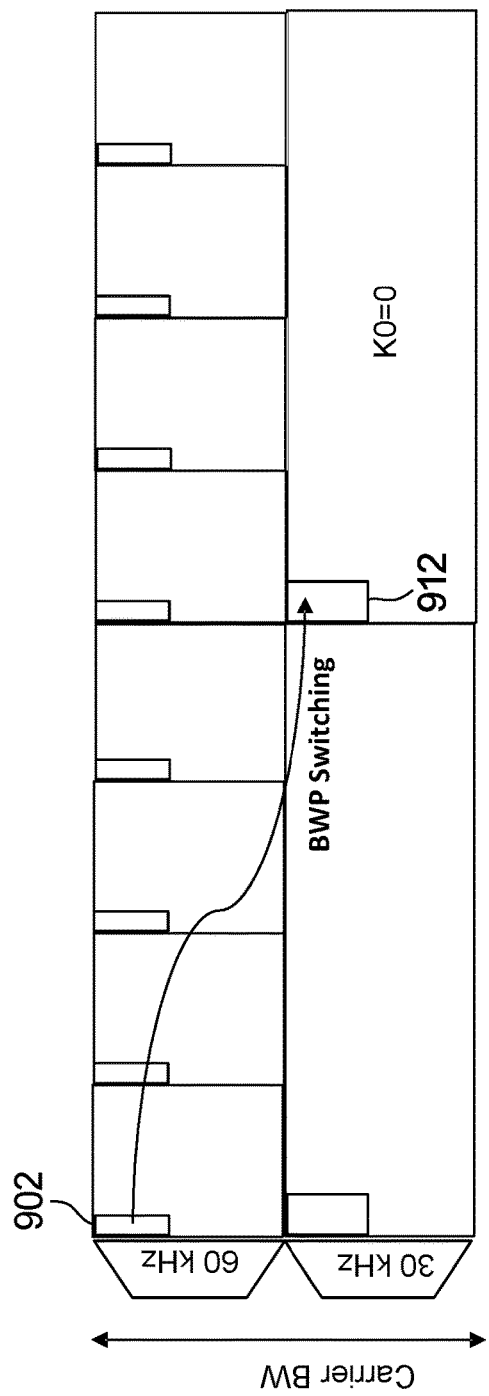
Figure 10:
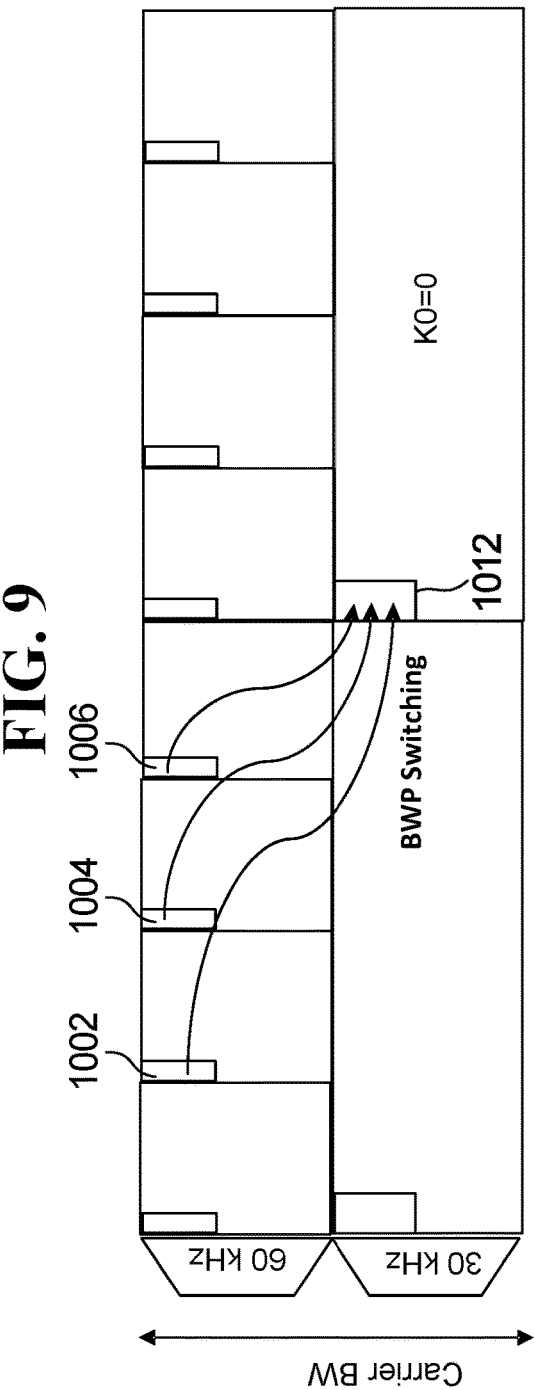

FIGS. 9 and 10 illustrate further examples of K0=0 (same-slot) scheduling, for BWP switching from a 60 kHz SCS BWP to a 30 kHz SCS BWP. In FIG. 9, BWP switching is scheduled at 902 and the BWP switching is completed at 912 according to monitoring periodicity for the scheduled 30 kHz SCS BWP. FIG. 10 illustrates three examples of BWP switching, signalled at 1002, 1004, 1006, and completed at 1012 according to monitoring periodicity for the scheduled 30 kHz SCS BWP. In FIG. 10, transition time is presumed to be less than one mini-slot of the 60 kHz SCS BWP for signaling at 1006, less than two mini-slots of the 60 kHz SCS BWP for signaling at 1004, and less than three mini-slots of the 60 kHz SCS BWP for signaling at 1002.

The signaling and switching example shown in FIG. 9 could be supported in embodiments by Options A, B and B-1 described above. The examples shown in FIG. 10 could be supported in an embodiment by Option A and B described above. An Option B-1 embodiment that is restricted to signaling BWP switching at a slot boundary would not support the examples shown in FIG. 10, because 1002, 1004, 1006 are not at a slot boundary.

Figure 11:
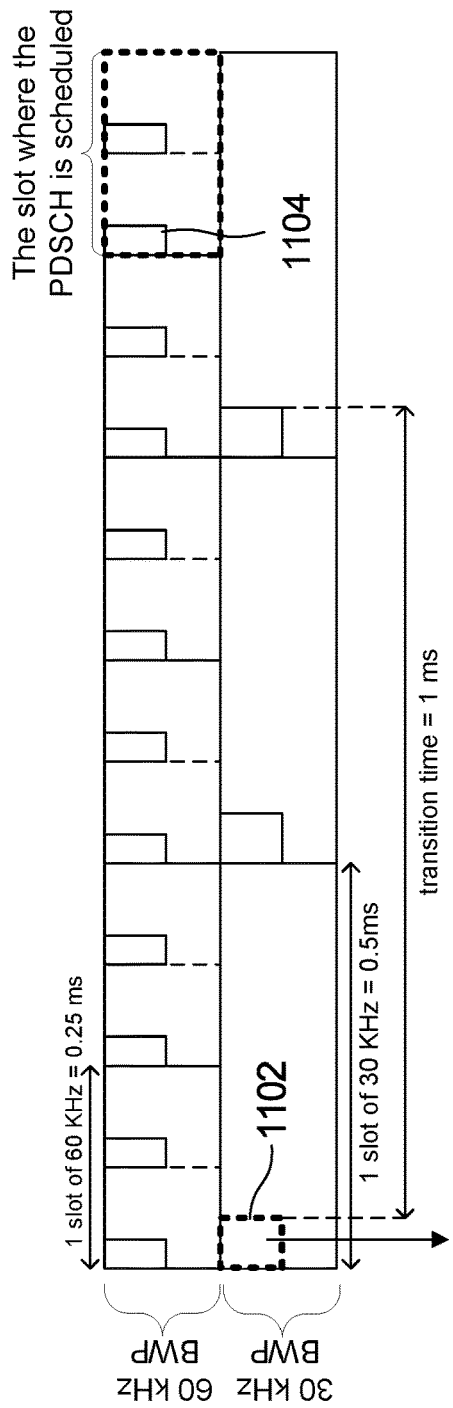
Figure 12:
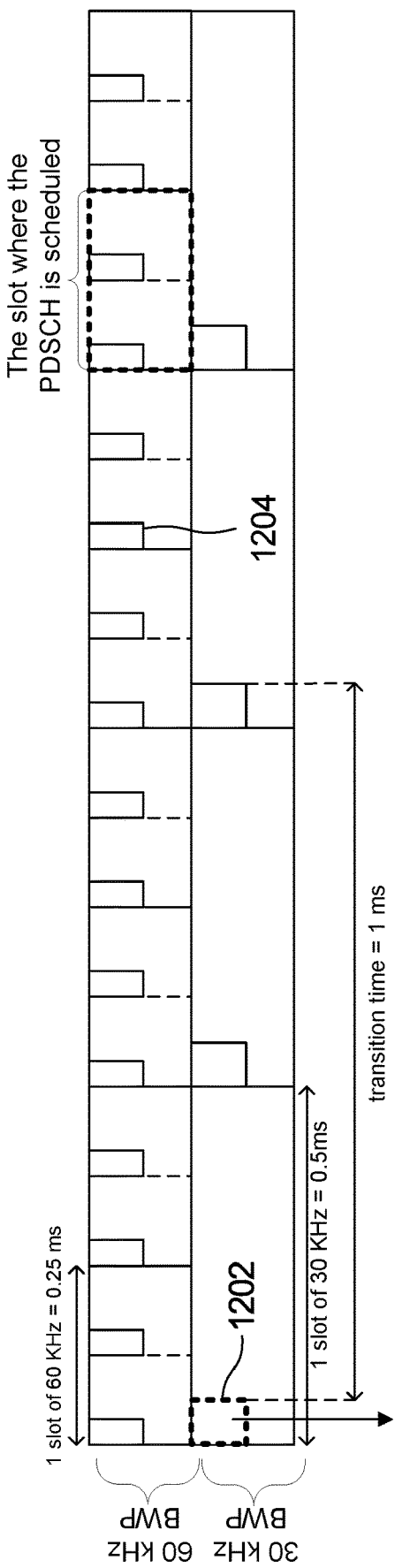

Additional examples are shown in FIGS. 11 and 12. FIG. 11 illustrates an example of same-slot PDSCH scheduling with K0=0, and FIG. 12 illustrates an example of cross-slot PDSCH scheduling with K0=1. In FIG. 11, BWP switching is signaled at 1102, and the first slot (two blocks in the 60 kHz BWP) that has a monitoring occasion 1104 after the transition time is where the PDSCH is scheduled for the UE that is switching from the 30 kHz BWP to the 60 kHz BWP. In FIG. 12, BWP switching is signaled at 1202, and the second slot (K0=1 in FIG. 12), after the first slot that has a monitoring occasion 1204 after the transition time, is where the PDSCH is scheduled for the UE that is switching from the 30 kHz BWP to the 60 kHz BWP.

Monitoring periodicity in FIGS. 11 and 12 is one slot (e.g., 14 symbols) for the 30 kHz BWP, and twice per slot (e.g., 7 symbols) for the 60 kHz BWP. The transition time in the examples shown is 1 ms. These parameters, and the K0 values of 0 and 1, are intended solely for illustrative purposes and not to limit the disclosed embodiments in any way.

Embodiments are described above primarily in the context of example methods and operations. Other embodiments are also contemplated.

For example, a non-transitory processor-readable medium could store instructions which, when executed by one or more processors, cause the one or more processors to perform a method disclosed herein.

Embodiments could also or instead be implemented in apparatus such as a UE. For example, an apparatus could include a processor and a non-transitory computer readable storage medium storing instructions for execution by the processor. The instructions, in some embodiments, cause the processor to perform a method that involves receiving an indication of a scheduled BWP for the UE; determining whether the scheduled BWP has a different numerology than a scheduling BWP that is currently active for the UE; switching from the scheduling BWP to the scheduled BWP based on a control signaling monitoring periodicity of the scheduled BWP if the scheduled BWP has a different numerology than the scheduling BWP.

Embodiments could include any of the following features, alone or in any combinations:
the instructions configure the processor to switch to the scheduled BWP based on the monitoring periodicity and timing of a control signaling candidate after a transition time following the receiving;
the instructions configure the processor to switch to the scheduled BWP based on the monitoring periodicity and timing of a control signaling candidate aligned with a boundary associated with the scheduled BWP;
the instructions configure the processor to switch to the scheduled BWP based on the timing of the control signaling candidate aligned with the boundary associated with the scheduled BWP after a transition time following the receiving;
the boundary comprises a frame boundary, a sub-frame boundary, a multiple sub-frame boundary, a slot boundary, or a multi-slot boundary;
the transition time is considered after a UE processing time for HARQ;
the transition time depends on a UE processing time and HARQ timing capability;

the transition time comprises one of different transition times specified for different UE processing time and HARQ timing capabilities;

the indication comprises an implicit indication.

The apparatus embodiments above refer to a processor. It should also be appreciated that one or more steps of the embodiment methods provided herein may be performed by corresponding units or modules. For example, a signal may be received by a receiving unit or a receiving module. Similarly, a signal may be transmitted by a transmitting unit or a transmitting module. A signal may be processed by a processing unit or a processing module. Other operations could be performed by these and/or other modules. For example, a receiving unit, a receiving module, or a controller or control module could perform operations associated with BWP switching as disclosed herein.

Respective units/modules could be implemented using hardware, software, or a combination thereof. For instance, one or more of the units/modules may be an integrated circuit, such as field programmable gate arrays (FPGAs) or application-specific integrated circuits (ASICs). It will be appreciated that where the modules are implemented using software, they may be retrieved by a processor, in whole or part as needed, individually or together for processing, in single or multiple instances, and that the modules themselves may include instructions for further deployment and instantiation.

Additional details regarding the EDs 110 and the base stations 170 in which embodiments could be implemented are known to those of skill in the art. As such, these details are omitted here for clarity.

The previous description of some embodiments is provided to enable any person skilled in the art to make or use an apparatus, method, or computer/processor readable medium according to the present disclosure.

Various modifications to the embodiments described herein may be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

For example, a method performed at network equipment could involve: transmitting an indication of a scheduled BWP to a UE, the scheduled BWP having a different numerology than a scheduling BWP that is currently active for the UE, to cause the UE to switch from the scheduling BWP to the scheduled BWP based on a control signaling monitoring periodicity of the scheduled BWP; and communicating with the UE using the scheduled BWP.

Another example of a method that could be performed at network equipment involves: transmitting to a UE, using a scheduling BWP that is currently active for the UE, an indication of a scheduled BWP having a different numerology than the scheduling BWP; transmitting data to the UE using the scheduled BWP and based on a control signaling monitoring periodicity of the scheduled BWP. In such an embodiment, the network equipment can determine where data is to be transmitted to the UE (and/or received from the UE) based on the control signaling monitoring periodicity.

Embodiments could include any of the following features, alone or in any combinations:

the transmitting an indication comprises transmitting control signaling comprising the indication;

the transmitting an indication comprises transmitting scheduling downlink control information (DCI);

the indication comprises an explicit indication;

the explicit indication comprises an index, an offset from the scheduling BWP in a set of BWPs for the UE, or other information that explicitly specifies the scheduled BWP;

the indication comprises an implicit indication;

the communicating or the transmitting data comprises transmitting data to the UE based on the monitoring periodicity and timing of a control signaling candidate after a transition time following the transmitting an indication;

the communicating or the transmitting data comprises transmitting data to the UE based on the monitoring periodicity and timing of a control signaling candidate aligned with a boundary associated with the scheduled BWP;

the communicating or the transmitting data comprises transmitting data to the UE based on the timing of the control signaling candidate aligned with the boundary associated with the scheduled BWP after a transition time following the transmitting an indication;

the boundary comprises a frame boundary, a sub-frame boundary, a multiple sub-frame boundary, a slot boundary, or a multi-slot boundary;

the transition time is considered after a UE processing time for HARQ;

the transition time depends on a UE processing time and HARQ timing capability;

the transition time comprises one of different transition times specified for different UE processing time and HARQ timing capabilities;

Network equipment could include a processor; and a non-transitory computer readable storage medium storing instructions for execution by the processor. The instructions cause the processor to perform such a method as disclosed herein.

Such a non-transitory computer readable storage medium could also or instead be provided separately from a processor.

Various embodiments are disclosed herein, including the following examples.

An example 1 relates to a method performed at a UE, the method comprising: receiving an indication of a scheduled BWP for the UE; determining whether the scheduled BWP has a different numerology than a scheduling BWP that is currently active for the UE; switching from the scheduling BWP to the scheduled BWP based on a control signaling monitoring periodicity of the scheduled BWP if the scheduled BWP has a different numerology than the scheduling BWP.

An example 2 relates to the method of example 1, wherein the switching comprises switching to the scheduled BWP based on the monitoring periodicity and timing of a control signaling candidate after a transition time following the receiving.

An example 3 relates to the method of any one of examples 1 and 2, wherein the switching comprises switching to the scheduled BWP based on the monitoring periodicity and timing of a control signaling candidate aligned with a boundary associated with the scheduled BWP.

An example 4 relates to the method of example 3, wherein the switching comprises switching to the scheduled BWP based on the timing of the control signaling candidate aligned with the boundary associated with the scheduled BWP after a transition time following the receiving.

An example 5 relates to the method of example 3 or example 4, wherein the boundary comprises a frame boundary, a sub-frame boundary, a multiple sub-frame boundary, a slot boundary, or a multi-slot boundary.

An example 6 relates to the method of example 2 or example 4, wherein the transition time is considered after a UE processing time for HARQ.

An example 7 relates to the method of example 2 or example 4, wherein the transition time depends on a UE processing time and HARQ timing capability.

An example 8 relates to the method of example 2 or example 4, wherein the transition time comprises one of different transition times specified for different UE processing time and HARQ timing capabilities.

An example 9 relates to the method of any one of examples 1 to 8, wherein the indication comprises an implicit indication.

An example 10 relates to a non-transitory processor-readable medium storing instructions which, when executed by one or more processors, cause the one or more processors to perform a method according to any one of examples 1 to 9.

An example 11 relates to a UE comprising: a processor; and a non-transitory computer readable storage medium storing instructions for execution by the processor, the instructions causing the processor to perform a method comprising: receiving an indication of a scheduled BWP for the UE; determining whether the scheduled BWP has a different numerology than a scheduling BWP that is currently active for the UE; switching from the scheduling BWP to the scheduled BWP based on a control signaling monitoring periodicity of the scheduled BWP if the scheduled BWP has a different numerology than the scheduling BWP.

An example 12 relates to the UE of example 11, wherein the instructions configure the processor to switch to the scheduled BWP based on the monitoring periodicity and timing of a control signaling candidate after a transition time following the receiving.

An example 13 relates to the UE of any one of examples 11 and 12, wherein the instructions configure the processor to switch to the scheduled BWP based on the monitoring periodicity and timing of a control signaling candidate aligned with a boundary associated with the scheduled BWP.

An example 14 relates to the UE of example 13, wherein the instructions configure the processor to switch to the scheduled BWP based on the timing of the control signaling candidate aligned with the boundary associated with the scheduled BWP after a transition time following the receiving.

An example 15 relates to the UE of example 13 or example 14, wherein the boundary comprises a frame boundary, a sub-frame boundary, a multiple sub-frame boundary, a slot boundary, or a multi-slot boundary.

An example 16 relates to the UE of example 12 or example 14, wherein the transition time is considered after a UE processing time for HARQ.

An example 17 relates to the UE of example 12 or example 14, wherein the transition time depends on a UE processing time and HARQ timing capability.

An example 18 relates to the UE of example 12 or example 14, wherein the transition time comprises one of different transition times specified for different UE processing time and HARQ timing capabilities.

An example 19 relates to the UE of any one of examples 11 to 18, wherein the indication comprises an implicit indication.

An example 20 relates to a method performed at network equipment, the method comprising: transmitting an indication of a scheduled BWP to a UE, the scheduled BWP having a different numerology than a scheduling BWP that is currently active for the UE, to cause the UE to switch from the scheduling BWP to the scheduled BWP based on a control signaling monitoring periodicity of the scheduled BWP; and communicating with the UE using the scheduled BWP.

An example 21 relates to a method performed at network equipment, the method comprising: transmitting to a UE, using a scheduling BWP that is currently active for the UE, an indication of a scheduled BWP having a different numerology than the scheduling BWP; transmitting data to the UE using the scheduled BWP and based on a control signaling monitoring periodicity of the scheduled BWP.

An example 22 relates to the method of example 20 or example 21, wherein the transmitting an indication comprises transmitting control signaling comprising the indication.

An example 23 relates to the method of any one of examples 20 to 22, wherein the transmitting an indication comprises transmitting scheduling DCI.

An example 24 relates to the method of any one of examples 20 to 23, wherein the indication comprises an explicit indication.

An example 25 relates to the method of example 24, wherein the explicit indication comprises an index, an offset from the scheduling BWP in a set of BWPs for the UE, or other information that explicitly specifies the scheduled BWP.

An example 26 relates to the method of any one of examples 20 to 23, wherein the indication comprises an implicit indication.

An example 27 relates to the method of example 20 or example 21, wherein the communicating or the transmitting data comprises transmitting data to the UE based on the monitoring periodicity and timing of a control signaling candidate after a transition time following the transmitting an indication.

An example 28 relates to the method of any one of examples 20, 21, and 27, wherein the communicating or the transmitting data comprises transmitting data to the UE based on the monitoring periodicity and timing of a control signaling candidate aligned with a boundary associated with the scheduled BWP.

An example 29 relates to the method of example 28, wherein the communicating or the transmitting data comprises transmitting data to the UE based on the timing of the control signaling candidate aligned with the boundary associated with the scheduled BWP after a transition time following the transmitting an indication.

An example 30 relates to the method of example 28 or example 29, wherein the boundary comprises a frame boundary, a sub-frame boundary, a multiple sub-frame boundary, a slot boundary, or a multi-slot boundary.

An example 31 relates to the method of example 27 or example 29, wherein the transition time is considered after a UE processing time for HARQ.

An example 32 relates to the method of example 27 or example 29, wherein the transition time depends on a UE processing time and HARQ timing capability.

An example 33 relates to the method of example 27 or example 29, wherein the transition time comprises one of different transition times specified for different UE processing time and HARQ timing capabilities.

An example 34 relates to a non-transitory processor-readable medium storing instructions which, when executed by one or more processors, cause the one or more processors to perform a method according to any one of examples 20 to 33.

An example 35 relates to network equipment comprising: a processor; and a non-transitory computer readable storage medium storing instructions for execution by the processor, the instructions causing the processor to perform a method according to any one of examples 20 to 33.

These examples 1 to 35 relate to switching between BWPs with different numerologies. Other embodiments are also contemplated and consistent with the present disclosure.

Consider, for example another method that could be performed at a UE to control BWP switching. As noted above with reference to FIG. 5, BWP switching could be initiated in some embodiments in control signaling that aligns with a time unit boundary associated with the scheduling BWP. The time unit boundary associated with the scheduling BWP could be a slot of the scheduling BWP, for example, and other types of time unit boundaries are also disclosed herein.

In such embodiments, and possibly others, the control signaling could indicate switching from a first active BWP to a second active BWP or switching from a first active BWP pair to a second active BWP pair for the UE. The control signaling could include an implicit indication of the second active BWP or the second active BWP pair. In the case of BWP pairs, an indication of the second active BWP pair could be or include an indication of either or both of a DL or UL BWP of the second active BWP pair.

The first active BWP could be a first active DL BWP and the second active BWP could be a second active DL BWP, for example. In another embodiment, the first active BWP is a first active UL BWP and the second active BWP is a second active UL BWP.

The first active BWP could be the same as the scheduling BWP in some embodiments.

As in other embodiments disclosed herein, the second active BWP could have a different numerology than the first active BWP.

A boundary-based method, and other embodiments, could involve switching to the second active BWP at a time unit boundary associated with the second active BWP. Examples are shown in FIGS. 6 to 12. The time unit boundary associated with the second active BWP could be a frame boundary, a sub-frame boundary, a multiple sub-frame boundary, a slot boundary, or a multi-slot boundary, for example.

Regarding BWP pairs, the first active BWP pair could include a third active DL BWP and a third active UL BWP, and the second active BWP pair could include a fourth active DL BWP and a fourth active UL BWP. The third active DL BWP could be the same as the scheduling BWP. The fourth active DL BWP could have a different numerology than the third active DL BWP. The fourth active UL BWP could also or instead have a different numerology than the third active UL BWP.

A method related to BWP pairs could involve switching to the second active BWP pair at a time unit boundary associated with the fourth active DL BWP or the fourth active UL BWP. The time unit boundary associated with the fourth active DL BWP or the fourth active UL BWP could be, for example, a frame boundary, a sub-frame boundary, a multiple sub-frame boundary, a slot boundary, or a multi-slot boundary.

A non-transitory processor-readable medium could store instructions which, when executed by one or more processors, cause the one or more processors to perform such a boundary-based method.

Features could also or instead be implemented in a UE. A UE could include a processor; and a non-transitory processor-readable storage medium storing instructions for execution by the processor, for example. The instructions cause the processor to perform a method that involves receiving control signaling in a scheduling BWP. The control signaling indicates switching from a first active BWP to a second active BWP or switching from a first active BWP pair to a second active BWP pair for the UE, and aligns with a time unit boundary associated with the scheduling BWP. In an embodiment, the time unit boundary associated with the scheduling BWP is a slot of the scheduling BWP.

In UE embodiments, the first active BWP could be a first active DL BWP and the second active BWP could be a second active DL BWP, or the first active BWP could be a first active UL BWP and the second active BWP could be a second active UL BWP. The first active BWP and the second active BWP could have different numerologies.

As mentioned elsewhere herein, the first active BWP could be the same as the scheduling BWP.

The instructions could further cause the processor to switch to the scheduled BWP at a time unit boundary associated with the second active BWP. The time unit boundary associated with the second active BWP could be a frame boundary, a sub-frame boundary, a multiple sub-frame boundary, a slot boundary, or a multi-slot boundary.

In some embodiments, the first active BWP pair includes a third active DL BWP and a third active UL BWP and the second active BWP pair includes a fourth active DL BWP and a fourth active UL BWP. The third active DL BWP could be the same as the scheduling BWP.

The fourth active DL BWP could have a different numerology than the third active DL BWP, and/or the fourth active UL BWP could have a different numerology than the third active UL BWP.

The instructions could further cause the processor to switch to the second active BWP pair at a time unit boundary associated with the fourth active DL BWP or the fourth active UL BWP. The time unit boundary associated with the fourth active DL BWP or the fourth active UL BWP could be a frame boundary, a sub-frame boundary, a multiple sub-frame boundary, a slot boundary, or a multi-slot boundary.

In some embodiments, the control signaling includes an implicit indication of the second active BWP or the second active BWP pair.

Some embodiments relate to network-side features. A method performed at network equipment, for example, could involve transmitting control signaling to a UE in a scheduling BWP. The control signaling indicates switching from a first active BWP to a second active BWP or switching from a first active BWP pair to a second active BWP pair for the UE, and the control signaling aligns with a time unit boundary associated with the scheduling BWP.

Network-side embodiments could include other features as disclosed herein. For example, the control signaling could be or include DCI, and/or an explicit indication of the second active BWP or the second active BWP pair. The time unit boundary associated with the scheduling BWP is a slot of the scheduling BWP in some embodiments.

The first active BWP could be a first active DL BWP and the second active BWP could be a second active DL BWP, or first active BWP could be a first active UL BWP and the second active BWP could be a second active UL BWP. The first active BWP is the same as the scheduling BWP in some embodiments.

The second active BWP could have a different numerology than the first active BWP.

A method performed by network equipment could also involve communicating with the UE using the second active BWP based on a time unit boundary associated with the second active BWP. The time unit boundary associated with the second active BWP could be a frame boundary, a sub-frame boundary, a multiple sub-frame boundary, a slot boundary, or a multi-slot boundary.

In the case of BWP pairs, the first active BWP pair could include a third active DL BWP and a third active UL BWP and the second active BWP pair could include a fourth active DL BWP and a fourth active UL BWP. The third active DL BWP could be the same as the scheduling BWP. The fourth active DL BWP could have a different numerology than the third active DL BWP. The fourth active UL BWP could also or instead have a different numerology than the third active UL BWP.

A method could also involve network equipment communicating with the UE using the second active BWP based on a time unit boundary associated with the fourth active DL BWP or the fourth active UL BWP. The time unit boundary associated with the fourth active DL BWP or the fourth active UL BWP could be a frame boundary, a sub-frame boundary, a multiple sub-frame boundary, a slot boundary, or a multi-slot boundary.

According to another embodiment, a non-transitory processor-readable medium stores instructions which, when executed by one or more processors, cause the one or more processors to perform such a method. Network equipment could include, for example, a processor and a non-transitory processor-readable storage medium storing instructions for execution by the processor. The instructions cause the processor to perform a method as disclosed herein. Such a method could involve transmitting control signaling to a UE in a scheduling BWP, with the control signaling indicating switching from a first active BWP to a second active BWP or switching from a first active BWP pair to a second active BWP pair for the UE, and being aligned with a time unit boundary associated with the scheduling BWP.

Network equipment could embody any one or more of various features disclosed elsewhere herein. For example, the control signaling could be or include DCI. The control signaling could, also or instead, include an explicit indication of the second active BWP or the second active BWP pair.

In some embodiments, the time unit boundary associated with the scheduling BWP is a slot of the scheduling BWP.

The first active BWP could be or include a first active DL BWP and the second active BWP could be or include a second active DL BWP. Alternatively or in addition, the first active BWP could be or include a first active UL BWP and the second active BWP could be or include a second active UL BWP.

The first active BWP pair could be or include a third active DL BWP and a third active UL BWP and the second active BWP pair could be or include a fourth active DL BWP and a fourth active UL BWP.

In an embodiment, the instructions further cause the processor to communicate with the UE using the second active BWP based on a time unit boundary associated with the fourth active DL BWP or the fourth active UL BWP. The time unit boundary associated with the fourth active DL BWP or the fourth active UL BWP could be or include a slot boundary.

The invention claimed is:

1. A method comprising:
  receiving, by an apparatus, control signaling in a scheduling slot of a scheduling bandwidth part (BWP), wherein the control signaling indicates switching from a first active BWP to a second active BWP or switching from a first active BWP pair to a second active BWP pair for the apparatus,
  wherein the control signaling aligns with a time unit boundary associated with the scheduling BWP,
  wherein the control signaling indicates a plurality of slots scheduled for data transmission or reception in the second active BWP or the second active BWP pair,
  wherein the control signaling indicates an earliest slot in the plurality of slots using a non-negative integer K0, and
  wherein K0=0 corresponds to a slot of the second active BWP or the second active BWP pair which includes a control signaling monitoring occasion based on a control signaling monitoring periodicity of the second active BWP or the second active BWP pair and is on or after a boundary of the scheduling slot plus a transition time from the first active BWP to the second active BWP or from the first active BWP pair to the second active BWP pair.

2. The method of claim 1, wherein the time unit boundary associated with the scheduling BWP is a slot of the scheduling BWP.

3. The method of claim 1, wherein the first active BWP is a first active downlink (DL) BWP and the second active BWP is a second active DL BWP, or
  the first active BWP is a first active uplink (UL) BWP and the second active BWP is a second active UL BWP.

4. The method of claim 1, wherein the first active BWP is the same as the scheduling BWP.

5. The method of claim 1, further comprising:
  switching, by the apparatus, to the second active BWP at a time unit boundary associated with the second active BWP,
  wherein the time unit boundary associated with the second active BWP comprises a slot boundary.

6. The method of claim 1, wherein the first active BWP pair comprises a first active downlink (DL) BWP and a first active uplink (UL) BWP and the second active BWP pair comprises a second active DL BWP and a second active UL BWP.

7. The method of claim 6, further comprising:
  switching, by the apparatus, to the second active BWP pair at a time unit boundary associated with the second active DL BWP or the second active UL BWP,
  wherein the time unit boundary associated with the second active DL BWP or the second active UL BWP comprises a slot boundary.

8. An apparatus comprising:
  a processor; and
  a non-transitory processor-readable storage medium storing instructions for execution by the processor, the instructions causing the processor to perform a method comprising:
    receiving control signaling in a scheduling slot of a scheduling bandwidth part (BWP), wherein the control signaling indicates switching from a first active BWP to a second active BWP or switching from a first active BWP pair to a second active BWP pair for the apparatus, wherein the control signaling aligns with a time unit boundary associated with the scheduling BWP, wherein the control signaling indicates a plurality of slots scheduled for data transmission or reception in the second active BWP or the second active BWP pair, wherein the control signaling indicates an earliest slot in the plurality of slots using a non-negative integer K0, and wherein K0=0 corresponds to a slot of the second active BWP or the second active BWP pair which includes a control signaling monitoring occasion based on a control signaling monitoring periodicity of the second active BWP or the second active BWP pair and is on or after a boundary of the scheduling slot plus a transition time from the first active BWP to the second active BWP or from the first active BWP pair to the second active BWP pair.

9. The apparatus of claim 8, wherein the time unit boundary associated with the scheduling BWP is a slot of the scheduling BWP.

10. The apparatus of claim 8, wherein the first active BWP is a first active downlink (DL) BWP and the second active BWP is a second active DL BWP, or the first active BWP is a first active uplink (UL) BWP and the second active BWP is a second active UL BWP.

11. The apparatus of claim 8, wherein the first active BWP is the same as the scheduling BWP.

12. The apparatus of claim 8, wherein the instructions further cause the processor to switch to the scheduled BWP at a time unit boundary associated with the second active BWP, wherein the time unit boundary associated with the second active BWP comprises a slot boundary.

13. The apparatus of claim 8, wherein the first active BWP pair comprises a first active downlink (DL) BWP and a first active uplink (UL) BWP and the second active BWP pair comprises a second active DL BWP and a second active UL BWP.

14. The apparatus claim 13, wherein the instructions further cause the processor to switch to the second active BWP pair at a time unit boundary associated with the second active DL BWP or the second active UL BWP, wherein the time unit boundary associated with the second active DL BWP or the second active UL BWP comprises a slot boundary.

15. A method comprising:
transmitting, by a network equipment, control signaling to a user equipment (UE) in a scheduling slot of a scheduling bandwidth part (BWP), wherein the control signaling indicates switching from a first active BWP to a second active BWP or switching from a first active BWP pair to a second active BWP pair for the UE, wherein the control signaling aligns with a time unit boundary associated with the scheduling BWP, wherein the control signaling indicates a plurality of slots scheduled for data transmission or reception in the second active BWP or the second active BWP pair, wherein the control signaling indicates an earliest slot in the plurality of slots using a non-negative integer K0, and wherein K0=0 corresponds to a slot of the second active BWP or the second active BWP pair which includes a control signaling monitoring occasion based on a control signaling monitoring periodicity of the second active BWP or the second active BWP pair and is on or after a boundary of the scheduling slot plus a transition time from the first active BWP to the second active BWP or from the first active BWP pair to the second active BWP pair.

16. The method of claim 15, wherein the control signaling comprises downlink control information (DCI).

17. The method of claim 15, wherein the control signaling comprises an explicit indication of the second active BWP or the second active BWP pair.

18. The method of claim 15, wherein the time unit boundary associated with the scheduling BWP is a slot of the scheduling BWP.

19. The method of claim 15, wherein the first active BWP is a first active downlink (DL) BWP and the second active BWP is a second active DL BWP, or the first active BWP is a first active uplink (UL) BWP and the second active BWP is a second active UL BWP.

20. The method of claim 15, wherein the first active BWP pair comprises a first active downlink (DL) BWP and a first active uplink (UL) BWP and the second active BWP pair comprises a second active DL BWP and a second active UL BWP.

21. The method of claim 20, further comprising:
communicating, by the network equipment, with the UE using the second active BWP based on a time unit boundary associated with the second active DL BWP or the second active UL BWP, wherein the time unit boundary associated with the second active DL BWP or the second active UL BWP comprises a slot boundary.

22. A network equipment comprising:
a processor; and
a non-transitory processor-readable storage medium storing instructions for execution by the processor, the instructions causing the processor to perform a method comprising:
transmitting control signaling to a user equipment (UE) in a scheduling slot of a scheduling bandwidth part (BWP), wherein the control signaling indicates switching from a first active BWP to a second active BWP or switching from a first active BWP pair to a second active BWP pair for the UE, wherein the control signaling aligns with a time unit boundary associated with the scheduling BWP, wherein the control signaling indicates a plurality of slots scheduled for data transmission or reception in the second active BWP or the second active BWP pair, wherein the control signaling indicates an earliest slot in the plurality of slots using a non-negative integer K0, and wherein K0=0 corresponds to a slot of the second active BWP or the second active BWP pair which includes a control signaling monitoring occasion based on a control signaling monitoring periodicity of the second active BWP or the second active BWP pair and is on or after a boundary of the scheduling slot plus a transition time from the first active BWP to the second active BWP or from the first active BWP pair to the second active BWP pair.

23. The network equipment of claim 22, wherein the control signaling comprises downlink control information (DCI).

24. The network equipment of claim 22, wherein the control signaling comprises an explicit indication of the second active BWP or the second active BWP pair.

25. The network equipment of claim 22, wherein the time unit boundary associated with the scheduling BWP is a slot of the scheduling BWP.

26. The network equipment of claim 22, wherein the first active BWP is a first active downlink (DL) BWP and the second active BWP is a second active DL BWP, or
    the first active BWP is a first active uplink (UL) BWP and the second active BWP is a second active UL BWP.

27. The network equipment of claim 22, wherein the first active BWP pair comprises a first active downlink (DL) BWP and a first active uplink (UL) BWP and the second active BWP pair comprises a second active DL BWP and a second active UL BWP.

28. The network equipment of claim 27, wherein the instructions further cause the processor to communicate with the UE using the second active BWP based on a time unit boundary associated with the second active DL BWP or the second active UL BWP, wherein the time unit boundary associated with the second active DL BWP or the second active UL BWP comprises a slot boundary.

\* \* \* \* \*

UNITED STATES PATENT AND TRADEMARK OFFICE
CERTIFICATE OF CORRECTION

PATENT NO. : 10,945,277 B2
APPLICATION NO. : 16/222288
DATED : March 9, 2021
INVENTOR(S) : Javad Abdoli Page 1 of 1

It is certified that error appears in the above-identified patent and that said Letters Patent is hereby corrected as shown below:

In the Claims

Column 25, Line 41, Claim 14, delete "The apparatus claim 13" and insert --The apparatus of claim 13--.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*